US009936317B2

(12) United States Patent
Maher et al.

(10) Patent No.: US 9,936,317 B2
(45) Date of Patent: Apr. 3, 2018

(54) AUDIO CROSSTALK CALIBRATION SWITCH

(71) Applicant: Fairchild Semiconductor Corporation, San Jose, CA (US)

(72) Inventors: Gregory A. Maher, Cape Elizabeth, ME (US); Tyler Daigle, Portland, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/928,157

(22) Filed: Oct. 30, 2015

(65) Prior Publication Data

US 2016/0127828 A1 May 5, 2016

Related U.S. Application Data

(60) Provisional application No. 62/073,591, filed on Oct. 31, 2014.

(51) Int. Cl.
*H04B 15/00* (2006.01)
*H04R 29/00* (2006.01)
*H04R 5/04* (2006.01)

(52) U.S. Cl.
CPC ............. *H04R 29/001* (2013.01); *H04R 5/04* (2013.01); *H04R 2420/09* (2013.01)

(58) Field of Classification Search
CPC ........ H04R 5/04; H04R 29/00; H04R 29/001; H04R 2420/09

(Continued)

(56) References Cited

U.S. PATENT DOCUMENTS 5,509,078 A * 4/1996 Hiraoka .................... H03F 3/68 330/124 R
5,537,668 A 7/1996 Nambu et al.
(Continued)

FOREIGN PATENT DOCUMENTS

CN 1398501 A 2/2003
CN 101159995 A 4/2008
(Continued)

OTHER PUBLICATIONS

"U.S. Appl. No. 13/272,021, Non Final Office dated Jan. 29, 2014", 10 pgs.

(Continued)

*Primary Examiner* — William A Jerez Lora
(74) *Attorney, Agent, or Firm* — Brake Hughes Bellermann LLP

(57) ABSTRACT

Methods and apparatus for calibrating an audio system including headset coupled to an electronic device via an audio dongle. In an example, a circuit configured to couple a Universal Serial Bus (USB) audio dongle with an audio circuit of an electronic device can include a first impedance configured to couple with a first audio channel of the audio circuit, a second impedance coupled in series with the first impedance and configured to couple with a second audio channel of the audio circuit, a third impedance coupled to a ground sense channel and to a node common to the first impedance and the second impedance, and a controller configured to initiate a first signal on the first channel, to monitor crosstalk of the first signal on the second audio channel and to adjust a setting of the third impedance to reduce the crosstalk.

20 Claims, 4 Drawing Sheets

(58) Field of Classification Search
USPC ......... 381/1, 2, 17, 26, 28, 56, 58, 74, 94.1, 381/111, 309
See application file for complete search history.

(56) References Cited

U.S. PATENT DOCUMENTS

| | | | | |
|---|---|---|---|---|
| 7,925,030 | B2 | 4/2011 | Holmström et al. | |
| 8,130,972 | B2 | 3/2012 | Suzuki | |
| 8,831,230 | B2 * | 9/2014 | Llewellyn | H03F 3/187 381/1 |
| 2001/0049813 | A1 * | 12/2001 | Chan | G06F 17/5068 716/120 |
| 2002/0164042 | A1 * | 11/2002 | Vonlanthen | H04R 25/405 381/313 |
| 2008/0085010 | A1 | 4/2008 | Suzuki | |
| 2012/0262230 | A1 * | 10/2012 | Llewellyn | H03F 3/187 330/2 |
| 2013/0156238 | A1 * | 6/2013 | Birch | H03F 3/181 381/309 |
| 2014/0172422 | A1 * | 6/2014 | Hefetz | G10L 19/00 704/229 |
| 2015/0098579 | A1 * | 4/2015 | Holzmann | H04R 5/04 381/71.6 |

FOREIGN PATENT DOCUMENTS

| | | | |
|---|---|---|---|
| CN | 101491117 | A | 7/2009 |
| CN | 101491117 | A | 7/2009 |
| CN | 201781618 | U | 3/2011 |
| CN | 102739176 | A | 10/2012 |
| CN | 102739176 | A | 10/2012 |
| CN | 202663530 | U | 1/2013 |

OTHER PUBLICATIONS

"U.S. Appl. No. 13/272,021, Notice of Allowance dated Jun. 16, 2014", 8 pgs.
"U.S. Appl. No. 13/272,021, Response filed May 29, 2014 to Non Final Office Action dated Jan. 29, 2014", 9 pgs.
"Chinese Application Serial No. 201210111398.7, Office Action dated Aug. 5, 2014", w/ English Translation, 8 pgs.
"Chinese Application Serial No. 201220159022.9, Voluntary Amendment dated May 2, 2012", w/ English Translation, 3 pgs.

* cited by examiner

AUDIO CROSSTALK CALIBRATION SWITCH

PRIORITY AND RELATED APPLICATIONS

This application claims the benefit of priority to U.S. Provisional Patent Application Ser. No. 62/073,591 filed on Oct. 31, 2014, titled, "AUDIO CROSSTALK CALIBRATION SWITCH," which is incorporated by reference herein in its entirety.

OVERVIEW

Methods and apparatus for calibrating an audio system including headset coupled to an electronic device via an audio dongle. In an example, a circuit configured to couple a Universal Serial Bus (USB) audio dangle with an audio circuit of an electronic device can include a first impedance configured to couple with a first audio channel of the audio circuit, a second impedance coupled in series with the first impedance and configured to couple with a second audio channel of the audio circuit, a third impedance coupled to a ground sense channel and to a node common to the first impedance and the second impedance, and a controller configured to initiate a first signal on the first channel, to monitor crosstalk of the first signal on the second audio channel and to adjust a setting of the third impedance to reduce the crosstalk.

This overview is intended to provide a partial summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
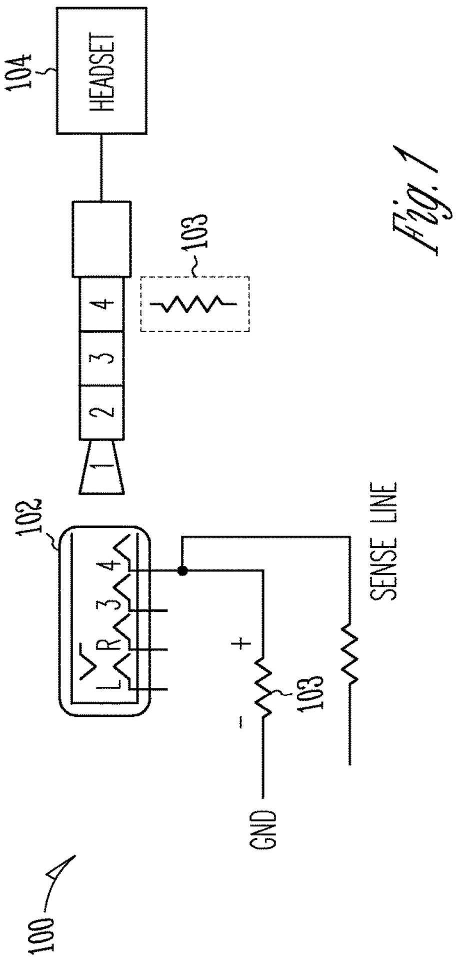
FIG. 1 illustrates generally an example audio jack connector 100.

In various examples, audio crosstalk can be detected and cancelled, such as disclosed in the commonly assigned Llewellyn U.S. Patent Application No. 2013/0016844, "Subsonic Test Signal Generation Technique," or the commonly assigned Llewellyn et al. U.S. Pat. No. 8,831,230, "Amplifier Crosstalk Cancellation Technique," both incorporated herein by reference in their entirety, FIG. 1 illustrates generally an audio jack connector 100. The audio jack connector 100 can include a plug 101 and a receptacle 102. In some examples, the audio jack connector 100 can include three complementary terminals. In other examples, the audio jack connector 100 can include four complementary terminals. It is known that the audio jack connector 100 can introduce parasitic impedances 103 in the ground path and the audio channels of an audio transducer device 104, such as a headset, for example, that can use the audio jack connector 100 to couple to an electronic device. The parasitic impedances 103 can cause crosstalk between the different audio channels of the audio transducer device 104. In this context, crosstalk is the imposition of signals intended for one audio channel of the audio transducer device 104 crossing over to other audio channels of the audio transducer device 104. For example, crosstalk can reduce stereo fidelity by having some of the signal intended for broadcast to the left hear via a left channel (L) crossing over and being broadcast to the right hear via a right channel (R). Crosstalk can also occur between audio output channels such as speaker channels and audio input channels such as a microphone channel.

Figure 2:
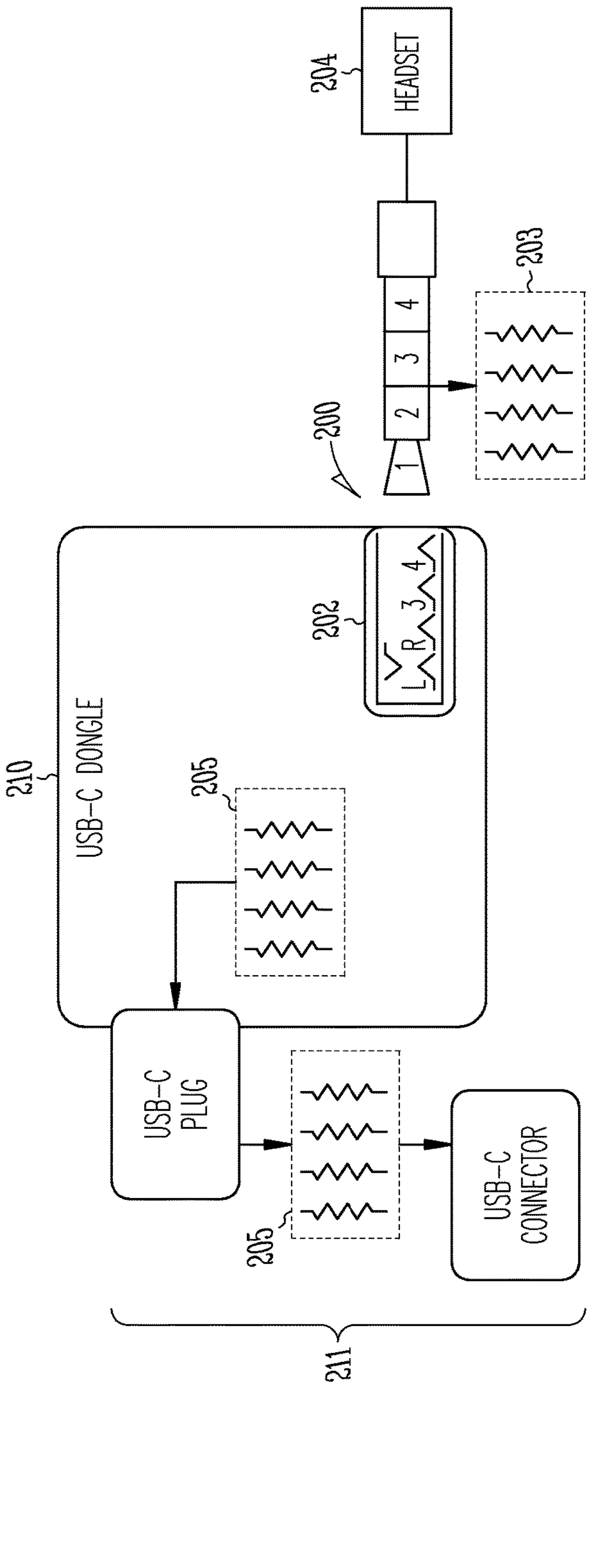
FIG. 2 illustrates generally an audio dongle that can include a portion of an audio jack connector.

FIG. 2 illustrates generally an audio dongle 210 that can include a portion 202 of an audio jack connector 200. The audio dongle 210 can couple an audio transducer device 204 to an electronic device via the audio jack connector 200 and a second different connector type, such as a Universal Serial Bus (USB) connector 211. However, audio dongles 210 can introduce impedances 205, in addition to other parasitic impedances 203, which can further introduce crosstalk into an audio system. Unlike the audio jack connector 100 of FIG. 1, the audio dongle 210 does not typically allow for a remote sense connection that can capture more fully the parasitic common path impedance, thus, compensating can be difficult.

The present inventors have recognized, among other things, circuits and methods configured to compensate for additional common path impedance introduced by new technology audio jack dongles or adapters (e.g., USB Type-C (USB-C), etc.) and to maintain previous system compatibility by configuring the orientation of a reversible adapter and by level shifting a sense line to null out resistance that is not compensated b the sense line. In certain examples, such compensation can be achieved with negligible additional active current to the system.

Figure 3:
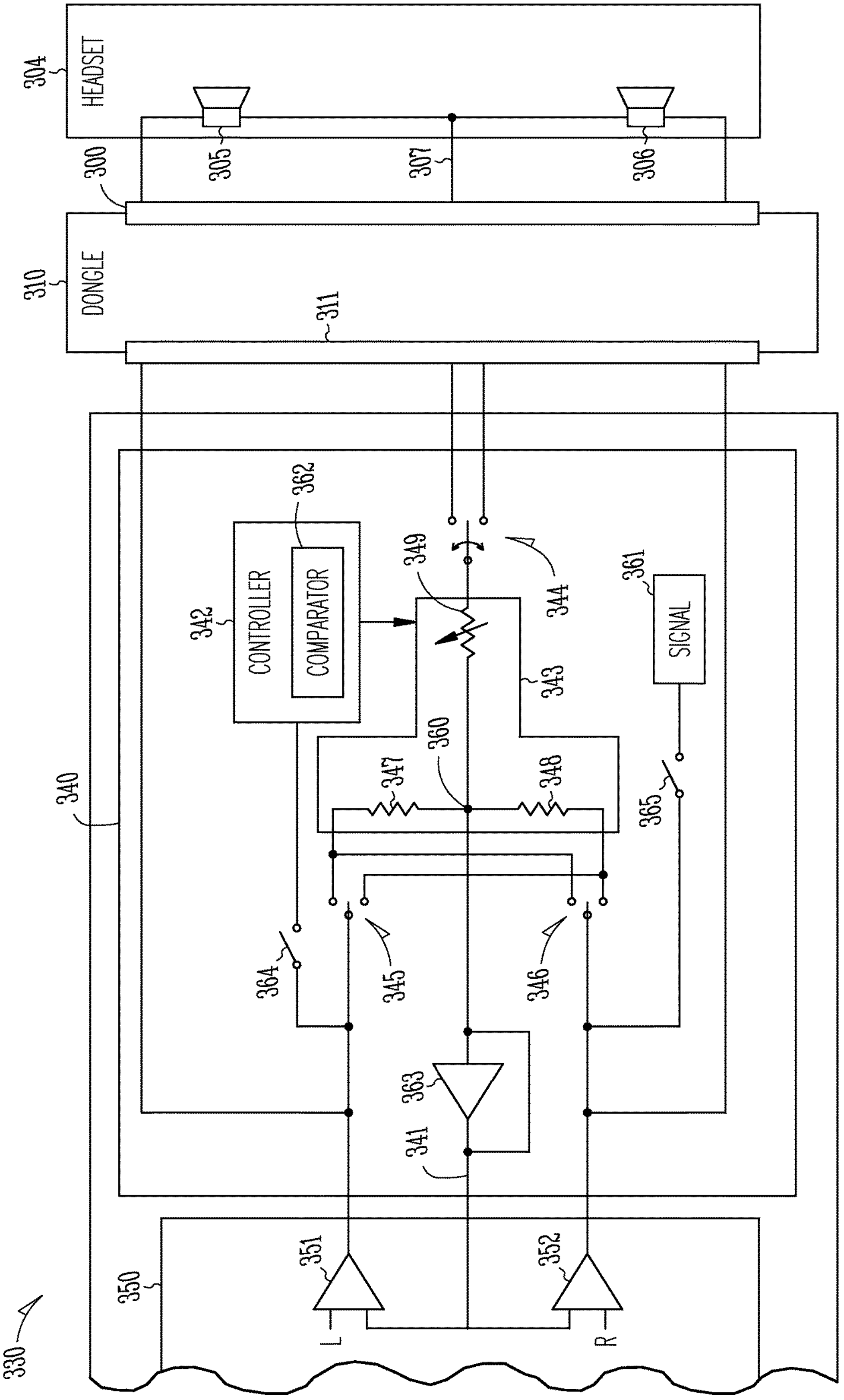
FIG. 3 illustrates generally an audio system including an example audio crosstalk calibration switch circuit.

FIG. 3 illustrates generally an audio system 330 including an example audio crosstalk calibration switch circuit 340. The system 330 can include an audio transducer device 304 such as a headset, an audio dongle 310, the audio crosstalk calibration switch circuit 340, and an electronic device 350. In certain examples, the audio transducer device 304 can include one or more speakers 305, 306, such as headphone or ear bud speakers. The one or more speakers 305, 306 can be coupled to a single conductor such as a ground conductor 307 in certain examples. In some examples, the audio transducer device 304 can include a microphone.

In certain examples, the audio dongle 310 can include a portion of an audio jack connector 300 for coupling to the audio transducer device 304 and one or more other connectors 311. In certain examples, audio channels, such as the left speaker conductor (L) and the right speaker conductor (R), can be coupled to terminals of the one or more other connectors 311 of the audio dongle 310. In certain examples, the one or more other connectors 311 can include USB connectors such as a USB-C connector. Such connectors are common on a variety of electronic devices 350 such that the audio dongle 310 can couple with many different types of electronic devices 350.

In certain examples, the electronic device 350 can play sounds on the speakers 305, 306 of the audio transducer device 304. In some examples, the electronic device 350 can receive a signal indicative of sounds captured by a microphone of the audio transducer device 304. In certain examples, the electronic device 350 can include the audio crosstalk calibration switch circuit 340. In some examples, the audio crosstalk calibration switch circuit 340 can be located within a housing of the audio dongle 310. The electronic device 350 can receive a level shifted ground sense input 341 from the audio crosstalk calibration switch circuit 340 and can use the level shifted ground sense input 341 as a reference for audio amplifiers 351, 352, such as audio amplifiers of an audio coder/decoder (CODEC) of the electronic device 350. It is understood that an electronic device 350 can include, but is not limited to, a personal computer, a mobile electronic device, a mobile communication device such as a cell phone or smart phone, a tablet computer, a laptop computer, wearable electronics, personal entertainment devices, a monitor, a television, a remote speaker, etc.

In certain examples, the audio crosstalk calibration switch circuit 340 can include a controller 342, a scaled model 343 of a headset and a plurality of switches 344, 345, 346 for configuring or calibrating the scaled model 343 to significantly reduce or eliminate crosstalk. In certain examples, the scaled model 343 of a headset can include at least three impedances 347, 348, 349. First and second impedances 247, 348 can be couple in series between two conductors configured to couple to audio channels of the system 330 such a right speaker channel and a left speaker channel. A third impedance 349 can be adjustable and can couple between a node 360 common to the first and second impedances and a ground terminal configured to couple to the audio dongle 310.

In certain examples, the audio crosstalk calibration switch circuit 340 can include a ground select switch 344 that can couple a node of the third impedance 349 to one of two terminals of the dongle connector 310. A purpose of the switch can be to adapt to a 3-pole audio jack being received by the dongle 310 or a 4-pole audio jack being received by the dongle 310, In some situations, for example, a 4-pole audio Jack receptacle can receive either a 3-pole audio jack plug or a 4-pole audio jack plug. However, the speaker common 307 or ground terminal of each audio jack plug can couple with a different terminal of the receptacle. In certain examples, the controller 342 can use detection circuits and methods to properly set the ground select switch 344, however, the details of such circuits and methods are beyond the scope of the present subject matter.

In certain examples, the audio crosstalk calibration switch circuit 340 can include a channel switch 345, 346 or channel switch circuit associated with each audio channel. In a first state, a channel switch 345, 346 can couple one of the first impedance 347 or the second impedance 348 to a first audio channel. In a second state, a channel switch 345, 346 can couple the respective first impedance 347 or the second impedance 348 to the other audio channel. In certain examples, each channel switch 345, 346 can be controlled by the controller 342.

In certain examples, during calibration to reduce cross talk, one of the audio channels can be coupled to a signal generator 361 simultaneously with the other audio channel being coupled to a comparator or comparator circuit 362. Upon application of a signal from the signal generator 361 on the one channel, the comparator circuit 362 can evaluate crosstalk on the other channel for example, by comparing the signal on the other channel to a reference signal. In certain examples, an output of the comparator circuit 362 can be used by the controller 342 to adjust the third impedance 349 to reduce, minimize, or eliminate the crosstalk on the other channel. In certain examples, the channel switches 345, 346 can switch the connection of the impedances 347, 348 to the audio channels and the calibration can be repeated with the other channel coupled to the signal generator 361 and the one channel coupled to the comparator or comparator circuit 362.

Upon exiting the calibration process, the channel switches 345, 346 can be set to states that couple one of the first or second impedances 347, 348 to a first audio channel and couples the other impedance of the first and second impedances 347, 348 to the other audio channel. The common node 360 of the first impedance, the second impedance and the third impedance can be coupled to a buffer 363, for example, an amplifier in a voltage follower configuration, and the output of the buffer 341 can be coupled to the electronic device 350 and used as a reference for one or more of the output audio amplifiers 351, 352 and/or a microphone amplifier.

In certain examples, the audio crosstalk calibration switch circuit 340 can optionally include the signal generator 361, the comparator or the comparator circuit 362, or both the signal generator 361 and the comparator or the comparator circuit 362. In such examples, the audio crosstalk calibration switch circuit can optionally include one or more switches 364, 365 to interface the respective device 361, 362 with a respective audio channel. For example, a signal generator switch 364 can be used to couple and isolate the signal generator 361 with/from one of the audio channels and a comparator switch 365 can be used to couple and isolate the comparator or comparator circuit 362 with/from the other audio channel.

Figure 4:
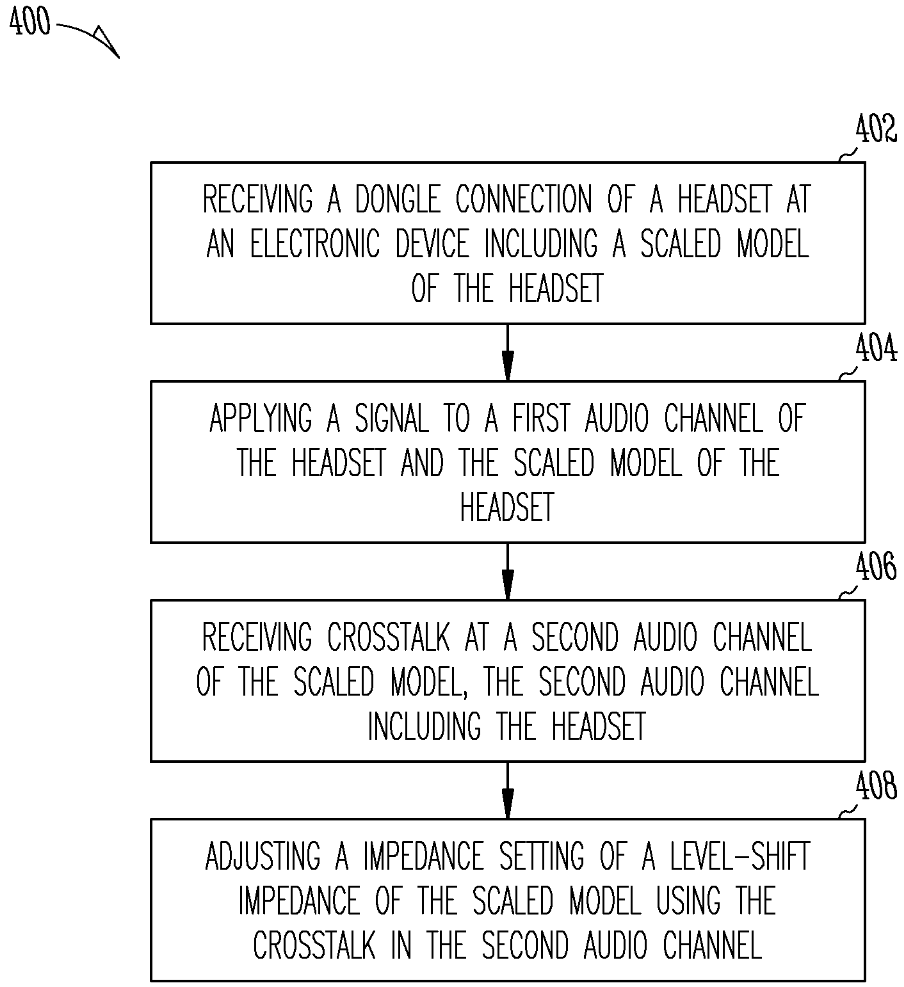
FIG. 4 illustrates generally a flowchart of an example calibration method of to reduce or eliminate crosstalk in a system that includes a headset coupled to a USB connector of an electronic device via an audio dongle.

FIG. 4 illustrates generally a flowchart of an example calibration method 400 of calibrating to reduce or eliminate crosstalk in a system that includes a headset coupled to a USB connector of an electronic device via an audio dongle. At 402, a dongle connection of a headset can be received at an electronic device. The electronic device can include a scaled model of the headset. At 404, a signal can be applied to a first audio channel of the system such that the signal is received by the scaled model and the headset. In certain examples, a first channel switch can couple a first impedance of the scaled model of the headset to the first audio channel. At 406, crosstalk can be received at a second audio channel of the system. The second audio channel can include the scaled model and the headset. In certain examples, a second channel switch can couple a second impedance of the scaled model with the second audio channel. At 408, an impedance setting of a third impedance, or a level shift impedance, of the scaled model can be adjusted to reduce or eliminate the crosstalk in the second audio channel.

Figure 5:
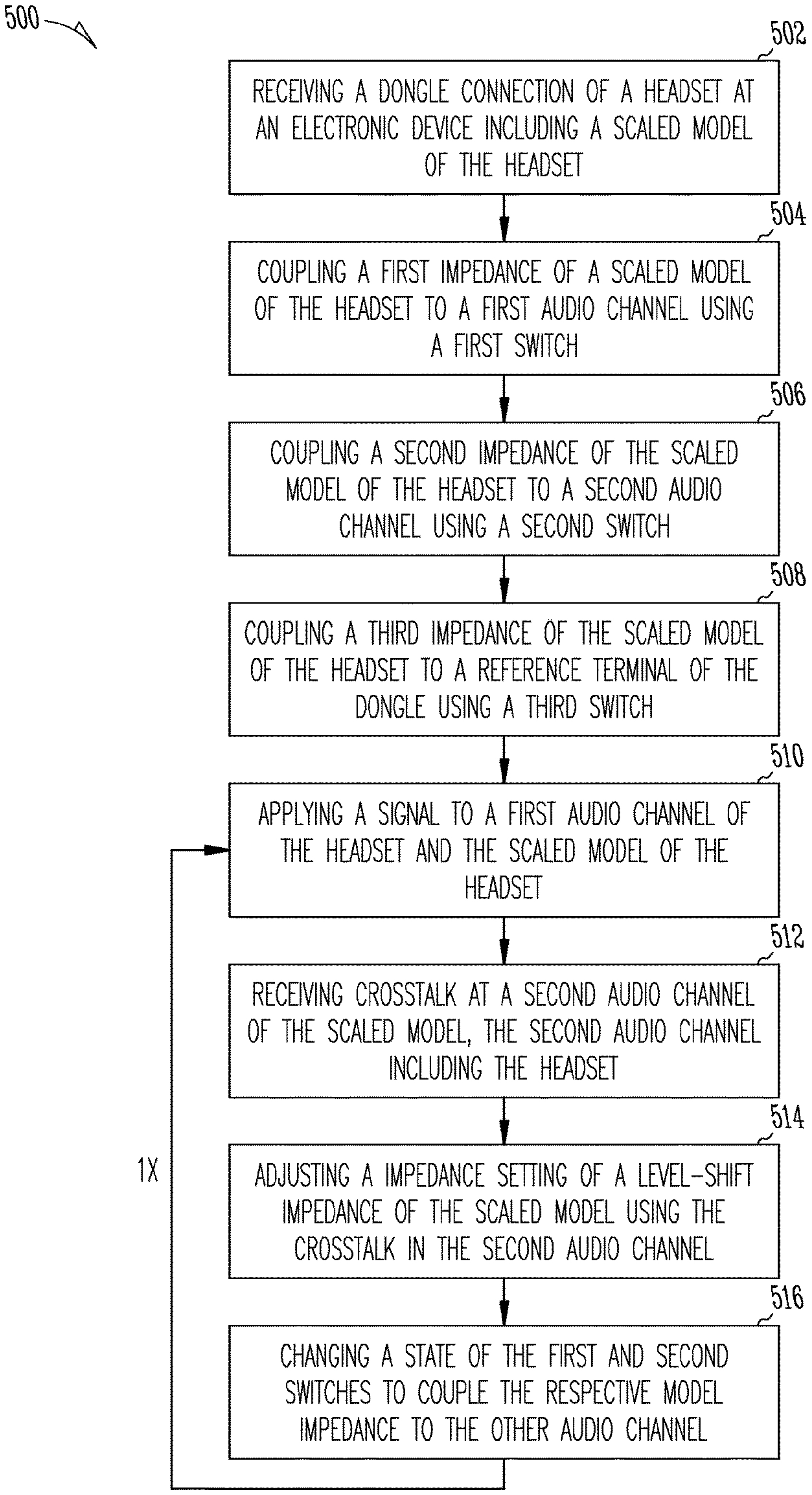
FIG. 5 illustrates generally a flowchart of an alternative example method of calibrating a system that includes a headset coupled to a USB connector of an electronic device via an audio dongle to reduce or eliminate crosstalk.

FIG. 5 illustrates generally a flowchart of an alternative example method 500 of calibrating a system that includes a headset coupled to a USB connector of an electronic device via an audio dongle to reduce or eliminate crosstalk. At 502, a dongle connection of a headset can be received at an electronic device. The electronic device can include a scaled model of the headset. At 504, a first impedance of the scaled model can be coupled to a first audio channel using a first switch, such a first channel switch. At 506, a second impedance of the scaled model can be coupled to a second audio channel using a second switch, such a second channel switch. At 506, a third impedance, such as an adjustable impedance, of the scaled model can be coupled to a reference terminal of the dongle using a third switch, such a calibration switch.

At 508, a signal can be applied to a first audio channel of the system such that the signal is received by the scaled model and the headset. At 510, crosstalk can be received at a second audio channel of the system. The second audio channel can include the scaled model and the headset. At 512, an impedance setting of a third impedance, or a level shift impedance, of the scaled model can be adjusted to reduce or eliminate the crosstalk in the second audio channel. At 514, the state of the first and second switches can be set couple the respective impedances to the other audio channel and the application of the signal and adjustment of the third impedance can be repeated with the signal applied to the second impedance. At the conclusion of the calibration, the channel switches can couple the first and second impedance of the scaled model of the headset in series between the first and second audio channels for normal operation of the audio system. As such, the node directly coupled to the first impedance, the second impedance and the third impedance can provide a level-shifted ground sense such that an additional ground sense conductor is not required to provide the actual ground level at the headset.

In certain examples, where an audio crosstalk calibration switch circuit includes a controller, the scaled model of the headset, the first switch, the second switch, the third switch, and one or more of the signal generator for the calibration method and a comparator or comparator circuit, the audio crosstalk calibration switch circuit can also include one or more switches associated with the signal generator and the comparator. Such switches can be controlled by the controller and can allow coupling of the respective device to the audio channels during the calibration method and can allow the audio channels to be isolated from the respective devices during normal operation.

ADDITIONAL NOTES AND EXAMPLES

In Example 1, a circuit for coupling a Universal Serial Bus (USB) audio dongle with an audio circuit of an electronic device can include a first impedance configured to couple with a first audio channel of the audio circuit, a second impedance coupled in series with the first impedance and configured to couple with a second audio channel of the audio circuit, a third impedance coupled to a ground sense channel and to a node common to the first impedance and the second impedance, and a controller configured to initiate a first signal on the first channel, to monitor crosstalk of the first signal on the second audio channel and to adjust a setting of the third impedance to reduce the crosstalk.

In Example 2, the circuit of Example 1 optionally includes a first switch configured to couple the first audio channel with the first impedance in a first state of the first switch and to couple the first audio channel with the second impedance in a second state of the first switch.

In Example 3, the circuit of any one or more of Examples 1-2 optionally includes a second switch configured to couple the second audio channel with the first impedance in a first state of the second switch and to couple the second audio channel with the second impedance in a second state of the second switch.

In Example 4, the circuit of any one or more of Examples 1-3 optionally includes first and second ground sense channel terminals configured to couple to the USB dongle, and a third switch configured to couple the third impedance with the ground sense channel received on the first ground sense channel terminal in a first state of the third switch and to couple the third impedance with the ground sense channel received on the second ground sense channel terminal in a second state of the third switch.

In Example 5, the controller of any one or more of Examples 1-4 optionally, prior to initiating the first signal, is configured to place the first switch in the first state of the first switch and the second switch in the first state of the second switch.

In Example 6, the controller of any one or more of Examples 1-5 optionally, prior to initiating the first signal, is configured to place the first switch in the second state of the first switch and the second switch in the second state of the second switch.

In Example 7, the controller of any one or more of Examples 1-6 optionally after adjusting the setting of the third impedance to reduce the crosstalk a first time, is configured to change a state of both the first and second switches, to initiate a second signal on the first channel, to monitor second crosstalk of the first signal on the second audio channel and to adjust a setting of the third impedance a second time to reduce the second crosstalk.

In Example 8, the second signal of any one or more of Examples 1-7 optionally is an inaudible signal.

In Example 9, the first signal of any one or more of Examples 1-8 optionally is an inaudible signal.

In Example 10, a method for reducing crosstalk of a headset coupled to an electronic device via a Universal Serial Bus (USB) audio dongle can include applying a signal to a first audio channel of a scaled model of the headset, the scaled model having at least three impedances sharing a first node, wherein applying the signal includes applying the signal to a first impedance of the at least three impedances and applying the signal to the headset, receiving crosstalk at a second channel of the scaled model, the second channel including a second impedance of the at least three impedances and the headset, and adjusting a third impedance of the at least three impedances via a controller until the crosstalk in the second audio channel is substantially eliminated.

In Example 11, the method of any one or more of Examples 1-10 optionally including buffering a signal at the first node to provide a level shifted ground for the electronic device.

In Example 12, the method of any one or more of Examples 11-11 optionally including receiving a ground reference from the audio dongle at the third impedance.

In Example 13, the applying a signal to the first audio channel of any one or more of Examples 1-12 optionally includes coupling a signal generator to the first channel using a first switch.

In Example 14, the receiving crosstalk at the second channel of any one or more of Examples 1-13 optionally includes coupling a comparator to the second channel.

In Example 15, the adjusting the third resistance of any one or more of Examples 1-14 optionally includes comparing the crosstalk to a ground reference to provide a first crosstalk comparison result and adjusting the third impedance using a first crosstalk comparison result.

In Example 16, a circuit configured to couple a Universal Serial Bus (USB) audio dongle with an audio circuit of an electronic device, wherein the audio dongle is configured to receive an audio connection of a headset, can include a first impedance configured to couple with a first audio channel of the audio circuit, a second impedance coupled in series with the first impedance and configured to couple with a second audio channel of the audio circuit, a third impedance coupled to a ground sense channel and to a node common to the first impedance and the second impedance, a controller configured to initiate a first signal on the first channel, to monitor crosstalk of the first signal on the second audio channel and to adjust a setting of the third impedance to reduce the crosstalk, and wherein a first ratio of the first impedance to the third impedance, after adjustment of the third impedance, is substantially equal to a second ratio, the second ratio including a ratio of a speaker impedance of the headset to a common conductor impedance of a combination of the headset and the audio dongle.

In Example 17, the controller of any one or more of Examples 1-16 optionally includes a comparator configured to compare one of the first audio channel or the second audio channel with a reference signal and to provide an output indicative of an adjustment of the setting of the third impedance.

In Example 18, the circuit of any one or more of Examples 1-17 optionally includes a first switch to couple one of the first audio channel or the second audio channel with the comparator.

In Example 19, the circuit of any one or more of Examples 1-18 optionally includes a second switch configured to couple the first signal to the first audio channel.

In Example 20, the circuit of any one or more of Examples 1-19 optionally includes a signal generator configured to generate the first signal.

In Example 21, the first signal of any one or more of Examples 1-20 optionally includes is an inaudible signal.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the funtions of Examples 1 through 21.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A circuit configured to couple a Universal Serial Bus (USB) audio dongle with an audio circuit of an electronic device, the circuit comprising:

a first impedance configured to be coupled with a first audio channel of the audio circuit;

a second impedance coupled in series with the first impedance and configured to be coupled with a second audio channel of the audio circuit;

a third impedance coupled to a ground sense channel and to a node common to the first impedance and the second impedance, the ground sense channel configured to be coupled to the USB audio dongle; and a controller configured to initiate a first signal on the first audio channel, to monitor crosstalk of the first signal on the second audio channel and to adjust a setting of the third impedance to reduce the crosstalk.

2. The circuit of claim 1, including a first switch configured to couple the first audio channel with the first impedance in a first state of the first switch and to couple the first audio channel with the second impedance in a second state of the first switch.

3. The circuit of claim 2, including a second switch configured to couple the second audio channel with the first impedance in a first state of the second switch and to couple the second audio channel with the second impedance in a second state of the second switch.

4. The circuit of claim 3, including:

first and second ground sense channel terminals configured to be coupled to the USB audio dongle; and a third switch configured to couple the third impedance with the ground sense channel received on the first ground sense channel terminal in a first state of the third switch and to couple the third impedance with the ground sense channel received on the second ground sense channel terminal in a second state of the third switch.

5. The circuit of claim 3, wherein the controller, prior to initiating the first signal, is configured to place the first switch in the first state of the first switch and the second switch in the first state of the second switch.

6. The circuit of claim 3, wherein the controller, prior to initiating the first signal, is configured to place the first switch in the second state of the first switch and the second switch in the second state of the second switch.

7. The circuit of claim 3, wherein the controller after adjusting the setting of the third impedance to reduce the crosstalk a first time, is configured to change a state of both the first and second switches, to initiate a second signal on the first audio channel, to monitor second crosstalk of the first signal on the second audio channel and to adjust a setting of the third impedance a second time to reduce the second crosstalk.

8. The circuit of claim 7, wherein the second signal is an inaudible signal.

9. The circuit of claim 1, wherein the first signal is an inaudible signal.

10. A method for reducing crosstalk of a headset coupled to an electronic device via a Universal Serial Bus (USB) audio dongle, the method comprising:

applying a signal to a first audio channel of a scaled model of the headset, the scaled model having at least three impedances sharing a first node, the applying the signal including applying the signal to a first impedance of the at least three impedances and applying the signal to the headset via the USB audio dongle, the scaled model including a second audio channel having a second impedance of the at least three impedances;

receiving a ground reference signal at a third impedance of the at least three impedances via the USB audio dongle;

receiving crosstalk at the second audio channel of the scaled model; and adjusting the third impedance of the at least three impedances via a controller until the crosstalk in the second audio channel is substantially eliminated.

11. The method of claim 10, including buffering a signal at the first node to provide a level shifted ground for the electronic device, the signal at the first node being based on the ground reference signal.

12. The method of claim 10, wherein applying a signal to the first audio channel includes coupling a signal generator to the first audio channel using a first switch.

13. The method or claim 10, wherein the receiving crosstalk at the second audio channel includes coupling a comparator to the second audio channel.

14. The method of claim 10, wherein adjusting the third impedance includes comparing the crosstalk to the ground reference signal to provide a first crosstalk comparison result and adjusting the third impedance using the first crosstalk comparison result.

15. A circuit configured to couple a Universal Serial Bus (USB) audio dongle with an audio circuit of an electronic device, wherein the USB audio dongle is configured to receive an audio connection of a headset, the circuit comprising:

a first impedance configured to be coupled with a first audio channel of the audio circuit;

a second impedance coupled in series with the first impedance and configured to be coupled with a second audio channel of the audio circuit;

a third impedance coupled to a ground sense channel and to a node common to the first impedance and the second impedance, wherein the node is directly coupled to the first impedance and to the second impedance; and a controller configured to initiate a first signal on the first audio channel, to monitor crosstalk of the first signal on the second audio channel and to adjust a setting of the third impedance to reduce the crosstalk, wherein a first ratio of the first impedance to the third impedance, after adjustment of the third impedance, is substantially equal to a second ratio, the second ratio including a ratio of a speaker impedance of the headset to a common conductor impedance of a combination of the headset and the USB audio dongle.

16. The circuit of claim 15, wherein the controller includes a comparator configured to compare one of the first audio channel or the second audio channel with a reference signal and to provide an output indicative of an adjustment of the setting of the third impedance.

17. The circuit of claim 16, a first switch to couple one of the first audio channel or the second audio channel with the comparator.

18. The circuit of claim 15, a second switch configured to couple the first signal to the first audio channel.

19. The circuit of claim 15, including a signal generator configured to generate the first signal.

20. The circuit of claim 15, wherein the first signal is an inaudible signal.

* * * * *